(12) United States Patent
Richards et al.

(10) Patent No.: US 7,741,404 B2
(45) Date of Patent: Jun. 22, 2010

(54) POLYURETHANE DISPERSANTS

(75) Inventors: Stuart Nicholas Richards, Greater Manchester (GB); Andrew James Shooter, Greater Manchester (GB)

(73) Assignee: The Lubrizol Corporation, Wickliffe, OH (US)

( * ) Notice: Subject to any disclaimer, the term of this patent is extended or adjusted under 35 U.S.C. 154(b) by 708 days.

(21) Appl. No.: 10/556,697

(22) PCT Filed: May 11, 2004

(86) PCT No.: PCT/US2004/014790

§ 371 (c)(1),
(2), (4) Date: Oct. 10, 2006

(87) PCT Pub. No.: WO2004/104064

PCT Pub. Date: Dec. 2, 2004

(65) Prior Publication Data

US 2008/0167423 A1   Jul. 10, 2008

(30) Foreign Application Priority Data

May 15, 2003 (GB) ................... 0311121.8

(51) Int. Cl.
*C08L 75/04* (2006.01)
*C08G 18/00* (2006.01)
*C08G 18/32* (2006.01)
*C08G 18/38* (2006.01)
*C08J 3/00* (2006.01)
*C08K 3/20* (2006.01)

(52) U.S. Cl. ............................ 524/589; 528/59; 528/44; 528/60; 528/66; 528/73; 528/80; 528/81; 528/84; 528/85; 524/590; 524/591; 524/839; 524/840

(58) Field of Classification Search ................ 524/589; 528/59

See application file for complete search history.

(56) References Cited

U.S. PATENT DOCUMENTS

| 3,925,582 | A | | 12/1975 | Sample, Jr. et al. |
|---|---|---|---|---|
| 4,000,218 | A | | 12/1976 | Critchfield et al. |
| 4,092,275 | A | | 5/1978 | Reischl et al. |
| 4,190,566 | A | | 2/1980 | Noll et al. |
| 4,764,553 | A | * | 8/1988 | Mosbach et al. ............ 524/591 |
| 4,794,147 | A | | 12/1988 | Savino et al. |
| 4,868,267 | A | * | 9/1989 | Bershas et al. .............. 528/73 |
| 4,874,837 | A | * | 10/1989 | Bershas et al. ............. 528/291 |
| 6,509,409 | B1 | * | 1/2003 | Thetford ..................... 524/589 |
| 6,562,897 | B1 | * | 5/2003 | Thetford ..................... 524/547 |
| 6,583,213 | B1 | * | 6/2003 | Fawkes et al. .............. 524/539 |
| 6,599,947 | B2 | * | 7/2003 | Thetford ..................... 516/31 |
| 2003/0181544 | A1 | * | 9/2003 | Thetford et al. ............. 523/160 |
| 2004/0260013 | A1 | * | 12/2004 | Richards ..................... 524/589 |
| 2008/0227945 | A1 | * | 9/2008 | Richards et al. ............. 528/75 |

FOREIGN PATENT DOCUMENTS

| EP | 0 060 430 A2 | 2/1982 |
|---|---|---|
| EP | 0 442 652 A2 | 8/1991 |
| GB | 1360007 A | 7/1974 |
| WO | WO 97/19120 A1 | 5/1997 |
| WO | WO 01/68783 A2 | 9/2001 |
| WO | WO 01/80987 A2 | 11/2001 |
| WO | WO 03/046038 A1 * | 6/2003 |

* cited by examiner

*Primary Examiner*—Marc S Zimmer
*Assistant Examiner*—Noah Frank
(74) *Attorney, Agent, or Firm*—Samuel B. Laferty; Thoburn T. Dunlap

(57) ABSTRACT

The present invention provides a non-aqueous composition containing a particulate solid, an organic medium and a polyurethane dispersant having an essentially linear backbone and laterally attached solvent-solubilising side chains of a polyester, a polyether, a polyacrylate or a polyolefin including mixtures of such side chains.

17 Claims, No Drawings

POLYURETHANE DISPERSANTS

CROSS REFERENCE

This application claims priority from PCT Application Ser. No. PCT/US2004/014790 filed on May 11, 2004, which claims the benefit of Great Britain Patent Application No. 0311121.8 filed on May 15, 2003.

FIELD OF INVENTION

The present invention relates to polyurethane dispersants, to dispersions, millbases, paints and inks containing a particulate solid dispersed in a non-aqueous organic medium, particularly a polar organic medium, including inks for use in non-contact printing processes such as "Drop-on-demand" printing process. In particular, the dispersants exhibit an essentially linear backbone with laterally attached sidechains of solvent solubilizing polyester, polyacrylic, polyether or polyolefin side chains including mixtures of such side chains.

BACKGROUND OF THE INVENTION

A polyurethane containing polyoxyethylene side-chains is known and has been described in the patent literature. For example, EP 060,430 discloses a process for making a polyurethane having polyalkylene oxide side-chains characterised in that the polyalkylene oxide used as starting alcohol has at least two free hydroxyl groups separated by not more than 3 carbon atoms, which hydroxy groups react with diisocyanates. The polyurethane may be used to stabilise or destabilise foams, emulsions and dispersions. They may also be used with pigments and fillers. However, there is no mention that the polyurethane may be used as dispersants in non-aqueous media and especially in the preparation of non-aqueous millbases, paints and inks.

JP1995179801 A discloses a water soluble acrylic graft copolymer with a polyurethane backbone. The grafted copolymer has carboxylic acid functional groups that may be incorporated into the backbone or within the grafted acrylic portion.

SUMMARY OF THE INVENTION

According to the invention there is provided a non-aqueous composition comprising a particulate solid, an organic medium and a polyurethane dispersant having an essentially linear backbone with laterally attached solvent-solubilizing side chains of polyester, polyacrylic, polyether or polyolefin including mixtures of such side chains.

DETAILED DESCRIPTION OF THE INVENTION

According to the invention there is provided a non-aqueous composition comprising a particulate solid, an organic medium and a polyurethane dispersant having an essentially linear backbone with laterally attached solvent-solubilizing side chains of polyester, polyacrylic (especially a polyacrylate), polyether or polyolefin including mixtures of such side chains. The optimum choice of the solvent solubilising side chain will be dependent on the polarity of the organic medium. In one embodiment the polyolefin is present and in another embodiment the polyolefin is absent.

In one embodiment the non-aqueous composition optionally contains 5 wt % or less water, preferably less than 2 wt %, more preferably less than 0.5 wt. % and most preferably no water.

Whereas the polyester, polyether, polyacrylate or polyolefin side chains may contain a terminating hydroxy group remote from the polyurethane backbone it is much preferred that such chains carry a [terminating] group which is not reactive with isocyanates and especially a $C_{1-50}$-hydrocarbyl group since this restricts any cross-linking during the preparation of the dispersant. The hydrocarbyl group may be optionally branched alkyl, cycloalkyl, aryl or aralkyl.

The cycloalkyl group is preferably $C_{3-6}$-cycloalkyl such as cyclopropyl and especially cyclohexyl.

The aryl group is preferably $C_{6-10}$-aryl such as naphthyl and especially phenyl which may be substituted by halogen, $C_{1-20}$-alkyl or $C_{1-20}$-alkoxy.

The aralkyl group is preferably 2-phenylethyl and especially benzyl where the phenyl ring is optionally substituted by halogen, $C_{1-20}$-alkyl or $C_{1-20}$-alkoxy.

The length of the alkyl terminating group of the polyester, polyether, polyacrylate, or polyolefin chain depends to a large extent on the nature of the organic medium. Thus, for example, when the organic medium is a polar organic liquid, the hydrocarbyl group is preferably $C_{1-12}$-alkyl which may be linear or branched. The hydrocarbyl group includes ethyl, propyl, isopropyl or mixtures thereof. When the polyurethane dispersant contains polyether side chains it is preferred that the terminating alkyl group is $C_{1-4}$ alkyl, for instance methyl, because of their ready commercial availability. When the organic medium is a non-polar organic liquid it is preferred that the terminating alkyl group contains greater than 8 carbon atoms. It is also preferred that the alkyl group is branched since this aids solubility in the non-polar organic liquid.

The polyether chain is preferably poly($C_{2-4}$-alkylene oxide) which contains less than 60%, more preferably less than 40%, and especially less than 20% by weight ethylene oxide relative to the total weight of the poly ($C_{2-4}$-alkylene oxide) chain.

The alkylene moiety of the ($C_{2-4}$-alkylene oxide) group may be linear or preferably branched and may be obtained by (co)polymerisation of alkylene oxides such as ethylene oxide, propylene oxide and butylene oxide or from tetrahydrofuran. Copolymers may be random or block copolymers.

Preferably, the polyether chain is obtainable from propylene oxide. It is also preferred that the polyether chain of the dispersant is obtainable from a poly($C_{2-4}$-alkylene oxide) mono-$C_{1-10}$-alkyl ether and especially a methyl or butyl ether.

The polyester chain is preferably obtainable or obtained from a hydroxy carboxylic acid containing from 1 to 26 carbon atoms or a lactone thereof. The choice of hydroxy carboxylic acid is largely influenced by the nature of the organic medium itself. Where the organic medium is a polar organic liquid, the hydroxy carboxylic acid preferably contains up to 8 carbon atoms and where the organic medium is a non-polar organic liquid the hydroxy carboxylic acid preferably contains more than 8 carbon atoms. It is particularly preferred that the polyester chain is obtainable from two or more different hydroxy carboxylic acids or lactones thereof since this aids solubility in the organic medium. The hydroxy carboxylic acid may be saturated or unsaturated, linear or branched.

Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid.

Examples of suitable lactones are β-propiolactone and optionally $C_{1-6}$-alkyl substituted δ-valerolactone and ε-caprolactone such as β-methyl-δ-valerolactone, δ-valerolactone, ε-caprolactone, 2-methyl, 3-methyl, 4-methyl, 5-tert butyl, 7-methyl-,4,4,6-trimethyl- and 4,6,6-trimethyl-ε-caprolactone, including mixtures thereof.

Polyester chains derivable from δ-valerolactone and ε-caprolactone are especially preferred.

The polyacrylate chains are preferably obtainable or obtained by (co)polymerising $C_{1-6}$-(alk)acrylate esters and especially (meth)acrylate esters (e.g. polymers from acrylic acid (optionally $C_{1-6}$ alkyl substituted) or esters from $C_{1-18}$ (more preferably $C_{1-8}$) alcohols and acrylic or $C_{1-6}$ alkyl substituted acrylic acid).

As disclosed hereinbefore, the polyurethane dispersants may contain mixtures of polyester, polyether and polyacrylate lateral side chains.

By way of an obvious variant, the polyester, polyether and polyacrylate lateral side chains may themselves be mixtures of such chains. Thus, for example, the polyester and polyacrylate side chains may contain a polyether moiety and so on.

The number-average molecular weight of the lateral polyester, polyether, polyacrylate, or polyolefin side chains in the polyurethane dispersant is preferably not greater than 10,000, more preferably not greater than 4,000 and especially not greater than 2,500. It is also preferred that the number-average molecular weight of the lateral polyester, polyether and polyacrylate side chains is not less than 300, more preferably not less than 600 and especially not less than 800.

As disclosed hereinbefore, the backbone of the polyurethane is essentially linear. Therefore, the isocyanates from which the dispersant is obtainable preferably have a functionality of from 2.0 to 2.5, more preferably from 2.0 to 2.1 and especially approximately 2.0.

The lateral side chain polyester, polyether, polyacrylate or polyolefin chains are connected to polyurethane backbone by oxygen and/or nitrogen atoms which are the residue of terminating hydroxy and amino (primary and secondary) groups of the polyester, polyether, polyacrylic (especially polyacrylate) or polyolefin.

When the lateral side chain is a polyether it is preferably the residue of a polyether which contains either two hydroxyl groups or one hydroxyl and one secondary amino group which react with isocyanates at one end of the polyether chain. The hydroxyl and amino groups are preferably separated by up to 6 carbon atoms. When the polyether contains two hydroxyl groups which react with isocyanates they are preferably separated by up to 17 atoms, especially 16 carbon atoms and one nitrogen atom. It is also preferred that the two hydroxyl groups are separated by not less than 5 atoms, especially 4 carbon atoms and one nitrogen atom. It is also possible to prepare the dispersant from a polyether which contains two amino groups (i.e. primary and/or secondary amino groups) which react with isocyanates but this is less preferred.

When the lateral side chain is a polyester, it is preferably the residue of the polyester which contains two hydroxyl groups at one end of the polyester chain which react with isocyanates. The hydroxyl groups are also preferably separated by up to 17 atoms, especially 16 carbon atoms and one nitrogen atom. It is especially preferred that the two hydroxyl groups are separated by not less than 5 atoms.

When the lateral side chain is a polyacrylate it is preferably the residue of a polyacrylate which contains two hydroxy groups at one end of the polyacrylate chain which react with isocyanates. The two hydroxyl groups are preferably separated by up to 4 carbon atoms, for example 2 carbon atoms. In one embodiment the polyacrylate is present and in another embodiment the polyacrylate is absent.

When the lateral side chain is a polyolefin it is preferably the residue of a polyolefin which contains either two hydroxyl groups or one hydroxyl and one secondary amino group which react with isocyanates at one end of the polyolefin chain. The hydroxyl and amino groups are preferably separated by up to 6 carbon atoms. When the polyolefin contains two hydroxyl groups which react with isocyanates they are preferably separated by up to 17 atoms, especially 16 carbon atoms and one nitrogen atom. It is also preferred that the two hydroxyl groups are separated by not less than 5 atoms, especially 4 carbon atoms and one nitrogen atom. It is also possible to prepare the dispersant from a polyolefin which contains two amino groups (i.e. primary and/or secondary amino groups) which react with isocyanates but this is less preferred.

The dispersant may also optionally contain an acid and/or amino group, including salts thereof, since such groups have been found to improve the dispersibility of some particulate solids. The amount of acid and/or amino groups in the polyurethane dispersant is preferably from 10 to 180, more preferably from 20 to 110 and especially from 20 to 60 milliequivalents for each 100 g polyurethane dispersant. Acid groups are preferred, especially carboxylic acid groups.

When the acid group is in the form of a salt, it may be the salt of an alkali metal such as sodium, potassium or lithium, a salt of an amine such as $C_{1-8}$-alkylamine or $C_{1-8}$-alkanolamine or a salt of a quaternary ammonium cation such as a $C_{1-8}$-alkyl quaternary ammonium cation or benzalkonium cation. The amino group may be quaternised by reaction with a dialkyl sulphate, such as dimethyl sulphate or benzyl chloride. Preferably the acid group, when present, is in the form of the free acid.

When the amino group is in the form of a salt, it may be the salt of an inorganic or organic acid. Examples of such acids are hydrochloric acid and acetic acids. Preferably, the amino group, when present, is in a non-ionised form.

The polyurethane dispersant may also contain the residue of formative compounds having a number average molecular weight of from 32 to 3,000 together with two groups which react with isocyanates.

The polyurethane dispersant may also have terminal polyester, polyether, polyacrylate or polyolefin chains. Such chains are similar to those described hereinbefore for the lateral chains but are obtainable from compounds having only the one group which reacts with isocyanates.

The total weight percentage of the solvent-soluble lateral and terminal chains in the polyurethane dispersant is preferably not less than 20%, more preferably not less than 30% and especially not less than 40%. It is also preferred that the total weight percentage of solvent-soluble lateral and terminal chains in the polyurethane dispersant is not greater than 90%, more preferably not greater than 80%, for instance 45% to 80% or 60% to 78%. In one embodiment the total weight percentage of solvent-soluble lateral and terminal chains in the polyurethane dispersant is not greater than 70%, for instance 55% to 65%.

The weight percentage of solvent-soluble lateral chains in the polyurethane dispersant is preferably not less than 5%, more preferably not less than 15% and especially not less than 25% or not less than 35%.

The particulate solid present in the composition may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, fire retardants such as those used in plastics materials and biocides, agrochemicals and pharmaceuticals which are applied as dispersions in organic media.

A preferred particulate solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred particulate solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The organic medium present in the composition is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petrolium distillates such as white spirit, mineral oils, vegetable oils and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

The resin may also be an unsaturated polyester resin including the so-called sheet moulding compounds and bulk moulding compounds which may be formulated with reinforcing fibres and fillers. Such moulding compounds are described in DE 3,643,007 and the monograph by P F Bruins entitled "Unsaturated Polyester Technology", Gordon and Breach Science publishers, 1976, pages 211 to 238.

If desired, the dispersions may contain other ingredients, for example resins (where these do not already constitute the organic medium) binders, fluidising agents (such as those described in GB-A-1508576 and GB-A-2108143), anti-sedimentation agents, plasticizers, levelling agents and preservatives.

The composition typically contains from 5 to 95% by weight of the particulate solid, the precise quantity depending on the nature of the solid and the relative densities of the solid and the organic medium. For example, a composition in which the solid is an organic material, such as an organic pigment, preferably contains from 15 to 60% by weight of the solid whereas a composition in which the solid is an inorganic material, such as an inorganic pigment, filler or extender, preferably contains from 40 to 90% by weight of the solid based on the total weight of composition.

The composition is preferably prepared by milling the particulate solid in the organic medium at a temperature which is not greater than 40° C. and especially not greater than 30° C. However, when the solid is a crude phthalocyanine pigment such as copper phthalocyanine, it is sometimes preferable to carry out the milling in an organic liquid at a temperature between 50 and 150° C. since greener and brighter shades may be obtained. This is particularly the case where the organic liquid is a high boiling aliphatic and/or aromatic distillate.

The composition may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the composition comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight dispersant based on the weight of the particulate solid.

As described hereinbefore, the compositions are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

The polyurethane dispersants may be prepared by any method known to the art and are obtainable or obtained by reacting together:

a) one or more polyisocyanates having an average functionality of from 2.0 to 2.5;

b) one or more compounds having at least one polyester, polyether, polyacrylate or polyolefin chain and at least two groups which react with isocyanates which are located at one end of the compound such that the polyester, polyether or polyacrylate chain(s) is laterally disposed in relation to the polyurethane polymer backbone;

c) optionally, one or more compounds having an acid or amino group, including salts thereof, and at least two groups which react with isocyanates;

d) optionally, one or more formative compounds having a number average molecular weight of from 32 to 3,000 which have at least two groups which react with isocyanates;

e) optionally, one or more compounds which act as chain terminators which contain one group which reacts with isocyanates;

f) optionally, one or more compounds which act as chain terminators which contain a single isocyanate group.

As noted hereinbefore the polyurethane dispersants have an essentially linear backbone and consequently it is much preferred that components (b), (c) and (d) contain only two groups which react with isocyanates. It is also preferred that component (a) has a functionality of from 2.1 to 2.0 and especially about 2 since this also limits any cross-linking between chains of the polyurethane dispersants.

Preferably, component (a) is a diisocyanate or mixtures of diisocyanates such as toluene diisocyanate (TDI), isophorone diisocyanate (IPDI), hexanediisocyanate (HDI), α,α-tetramethylxylene diisocyanate (IPDI), diphenylmethane-4,4'-diisocyanate (4,4'-MDI), diphenylmethane-2,4-diisocyanate (2,4'-MDI) and dicyclohexylmethane-4,4-diisocyanate (HMDI). Preferably, component (a) is either TDI or IPDI or MDI.

The compound having a polyether chain which is component (b) is preferably poly ($C_{2-3}$-alkylene oxide) which contains less than 60% poly(ethylene oxide) and also preferably contains two groups which react with isocyanates. Preferably, the amount of ethylene oxide is less than 40% and especially less than 20% by weight of the poly($C_{2-3}$-alkylene oxide) chain. There are a number of ways of incorporating a polyether lateral chain into an organic compound which contains these groups which react with isocyanates.

Thus, in the case where the two groups which react with isocyanates are both hydroxyl, a poly ($C_{2-4}$-alkylene oxide) chain may be conveniently attached by isocyanates having a functionality of two or more. Compounds of this type are described in U.S. Pat. No. 4,794,147, which involves sequentially reacting a mono-functional polyether with a polyisocyanate to produce a partially capped isocyanate intermediate and reacting the intermediate with a compound having at least one active amino hydrogen and at least two active hydroxyl groups.

One preferred class of compound of this type may be presented by the formula 1.

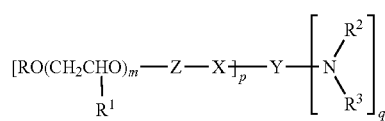

wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

R may be alkyl, aralkyl, cycloalkyl or aryl.
When R is aralkyl, it is preferably benzyl or 2-phenylethyl.
When R is cycloalkyl it is preferably $C_{3-8}$-cycloalkyl such as cyclohexyl.
When R is aryl it is preferably naphthyl or phenyl.
When R is alkyl, it may be linear or branched and preferably contains not greater than 12, more preferably not greater than 8 and especially not greater than 4 carbon atoms. It is especially preferred that R is methyl or butyl.

The $C_{2-4}$-alkylene radical represented by Z may be ethylene, trimethylene, 1,2-propylene or butylene.

Preferably m is not less than 10. It is also preferred that m is not greater than 100 and especially not greater than 80.

When q is 2 it is possible to link two different polyurethane polymer chains but it is much preferred that q is 1.

When the polyisocyanate has a functionality which is greater than 2, the compound which is component (b) may carry more than one poly (alkylene oxide) chain. However, it is much preferred that p is 1, q is 1 and that Y is the residue of a diisocyanate.

When $R^1$ is a mixture of hydrogen and methyl and Z is 1,2-propylene and X is —NH— the compound of formula 1 is a derivative of polyalkylene glycol amine such as a Jeffamine™ M polyether available from Huntsman Corporation.

Preferably, $R^2$ and $R^3$ are both 2-hydroxyethyl.

It is also preferred that X is O.

Compounds of formula 1 are typically prepared by reacting a mono-functional polyether with a polyisocyanate in an inert solvent such as toluene at a temperature of from 50 to 100° C. until the desired isocyanate value is reached optionally in the presence of an acid catalyst. In one embodiment the acid catalyst is present and in another embodiment the acid catalyst is absent. The temperature is then normally reduced to between 40 and 60° C. when the requisite secondary amine such as diethanolamine is added.

Useful compounds of formula 1 have been used as component (b) by reacting a poly (propylene glycol) mono methyl ether, a poly (propylene glycol) mono butyl ether or a Jeffamine™ M series polyether having a number average molecular weight of from 250 to 5,000 with a diisocyanate such as TDI followed by diethanolamine.

A second preferred type of compound which can be used as component (b) is of formula 2.

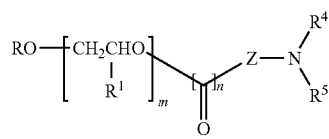

2 wherein

R, $R^1$, Z and m are as defined hereinbefore;

$R^4$ is an isocyanate reactive organic radical (group);

$R^5$ is hydrogen or an isocyanate-reactive organic radical; and n is 0 or 1.

Examples of compounds of formula 2 are disclosed in EP 317258.

The organic radical represented by $R^4$ and $R^5$ is an organic radical containing an isocyanate-reactive group, such as —OH, —SH, —COOH, —PO$_3$H$_2$ and —NHR$^6$ in which $R^6$ is hydrogen or optionally substituted alkyl. As specific examples of isocyanate-reactive radicals, there may be mentioned hydroxyalkyl, hydroxy alkoxy alkyl, hydroxy (poly alkylene oxy) alkyl and hydroxy alkoxy carbonyl alkyl.

A preferred type of compound of formula 2 is where n is zero, Z is 1,2-propylene, $R^4$ is —CH$_2$CH$_2$C(O)—O-(L)$_q$-H. Wherein L is a hydrocarbyl group or alkoxy group, preferably L is a $C_2$ to $C_3$ hydrocarbyl group or alkoxy group; and q is 1 to 20, preferably 1 to 6 and most preferably 1. $R^5$ is hydrogen. Compounds of this type are obtainable or obtained by the Michael addition reaction of a poly (alkylene oxide) monoalkyl ether monoamine and a hydroxy functional acrylate such as 2-hydroxyethyl acrylate or hydroxypropyl acrylate. A suitable source of poly (alkylene oxide) monoalkyl ether monoamine is the Jeffamine™ M series of polyethers available from Huntsman Corporation. The reaction between the poly (alkylene oxide) mono alkylether monoamine and 2-hydroxy functional acrylate is typically carried out in the presence of air and at a temperature of 50 to 100° C., optionally in the presence of a polymerisation inhibitor such as hydroquinone or butylated hydroxy toluene.

Another preferred type of compound of formula 2 is where n is zero, Z is 1,2-propylene and $R^4$ and $R^5$ are both 2-hydroxyethyl. Compounds of this type may be prepared by reacting a poly(alkylene oxide) mono alkyl ether mono amine with ethylene oxide under acidic conditions.

Yet another preferred type of compound of formula 2 is where n is zero, Z is 1,2-propylene and $R^4$ is —CH$_2$CH$_2$C(O)—O-(L)$_q$-H and $R^5$ is hydrogen. Wherein L is a hydrocarbyl group or alkoxy group, preferably L is a $C_2$ to $C_3$ hydrocarbyl group or alkoxy group; and q is 1 to 20, preferably 1 to 6 and most preferably 1. $R^5$ is hydrogen. Compounds of this type may be prepared by reacting a poly(alkylene oxide) mono alkyl ether mono amine with about one stoichiometric equivalent of ethylene oxide under acidic conditions.

Poly (alkylene oxide) monoalkyl ether monoamines may also be obtained from reaction of a poly (alkylene oxide) monoalkyl ether with acrylonitrile and hydrogen reduction according to the following general scheme where R and $R^1$ are as previously described.

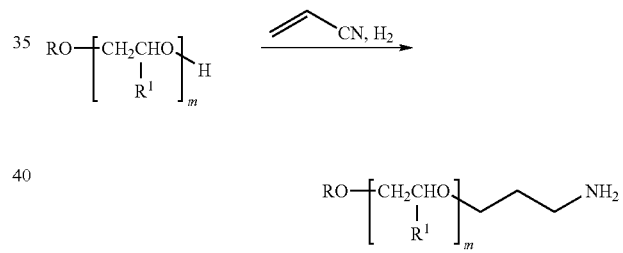

2A

A further preferred type of compound of formula 2 where n is zero, Z is 1,3-propylene and $R^4$ is 2-hydroxyethyl and $R^5$ is hydrogen may be obtained from reaction between poly (alkylene oxide) monoalkyl ether monoamines of formula 2A and a hydroxy functional acrylate such as 2-hydroxyethyl acrylate or hydroxypropyl acrylate.

A third preferred type of compound which may be used as component (b) is of formula 3:

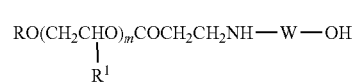

3 wherein R, $R^1$ and m are as defined hereinbefore and W is $C_{2-6}$-alkylene and especially ethylene. Compounds of this type are obtainable or obtained by the Michael addition reaction of a hydroxy amine and a poly (alkylene oxide) acrylate.

A fourth preferred type of compound which may be used as component (b) is of formula 4.

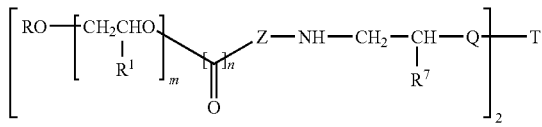

wherein

R, $R^1$, Z, m and n are as defined hereinbefore;

$R^7$ represents hydrogen, halogen or $C_{1-4}$ alkyl;

Q is a divalent electron withdrawing group; and

T is a divalent hydrocarbon radical which may carry substituents or contain hetero atoms.

Examples of electron withdrawing groups which may be represented by Q include —CO—, —COO—, —SO—, —SO$_2$—, —SO$_2$O— and —CONR$^8$— in which $R^8$ is hydrogen or alkyl.

Hydrocarbon radicals which may be represented by T include alkylene, arylene and mixtures thereof, said radicals optionally carrying substituents or containing hetero-atoms. Examples of suitable radicals represented by T are alkylene radicals containing from 1 to 12 carbon atoms, oxyalkylene and

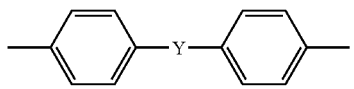

polyoxyalkylene radicals of the formula —(CH$_2$CHR$^1$O)$_x$ wherein $R^1$ is as defined hereinbefore and x is from 1 to 10, phenylene and diphenylene radicals and other arylene radicals such as wherein Y is —O—, —S—, —CH$_2$—, —CO— or —SO$_2$—

The compounds of Formula 4 are obtainable or obtained by the Michael addition reaction of two moles of a poly (alkylene oxide) monoalkyl ether monoamine with one mole of an unsaturated compound of the formula 5.

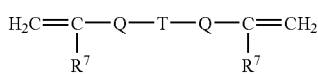

wherein Q, T and $R^7$ are as defined hereinbefore.

Examples of unsaturated compounds of Formula 5 are especially diacrylates and dimethacrylates wherein T is a $C_{4-10}$-alkylene residue, a polyoxyalkylene residue or an oxyethylated Bisphenol A residue.

When component (b) is a polyester containing two groups which react with isocyanates the polyester chain may be made by polymerising one or more hydroxy carboxylic acids or lactones thereof in the presence of either a hydroxy or carboxy containing compound which acts as a polymerisation terminating moiety.

The polyester obtained using a hydroxy containing compound as chain terminating compound is preferably of formula 6.

$$R^9O(OC\text{-}A\text{-}O)_mH \qquad 6$$

wherein m is as defined hereinbefore;

$R^9$ is $C_{1-50}$-hydrocarbyl group; and

A is $C_{1-26}$-alkylene and/or $C_{2-26}$-alkenylene.

The polyester obtained using a carboxylic containing compound as chain terminating compound is preferably of formula 7.

$$R^9CO(O\text{-}A\text{-}CO)_mOH \qquad 7$$

wherein $R^9$, A and m are defined hereinbefore.

The polyester of Formulae 6 and/or 7 are typically made by reacting one or more hydroxy carboxylic acids together with either a hydroxy containing compound or carboxy containing compound at 50 to 250° C. in an inert atmosphere and in the presence of an esterification catalyst. Typical process conditions are described in WO 01/80987.

Compounds of Formula 6 may be reacted with a polyisocyanate and a secondary amine under similar conditions described for the preparation of compounds of Formula 1 to form polyester analogues.

Compounds of Formula 7 may be converted to a mono hydroxy compound by reacting with a diol such as ethylene glycol or propylene glycol and the resulting mono hydroxy derivative treated in similar manner to the compound of Formula 6 in preparing polyester analogues to the polyether of Formula 1.

A polyester which contains 2 functional groups which are reactive towards an isocyanate at one end of the polyester may be prepared by the Michael addition of an aminoalcohol with a polyester acrylate such as a polycaprolactone acrylate with ethanolamine.

When component (b) is a compound which contains a poly(alk)acrylate chain it is preferably a poly(meth)acrylate containing either two hydroxyl groups at one end of the acrylate chain or one hydroxyl and one imino group at one end of the acrylate chain. The two hydroxyl groups or the one hydroxyl and one imino group are preferably separated by 1 to 6 carbon atoms. Polyacrylates of this type are obtainable or obtained by reacting a diol with an acrylate by, for example, Atom Transfer Radical Polymerisation as illustrated by the following reaction scheme. Reactions of this type are disclosed in Macromolecules 1995, 28, 1721 and 1997, 30, 2190 and in J. Am. Chem. Soc. 1995, 117, 5614.

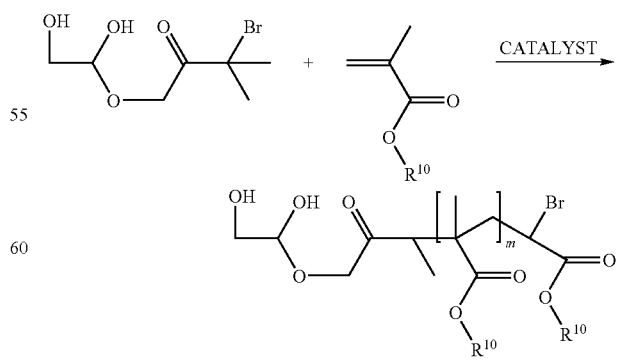

wherein $R^{10}$ is $C_{1-20}$-hydrocarbyl group and m is as defined hereinbefore.

Alternatively, a dihydroxy functional poly(alk)acrylate may be prepared by the free radical, polymerisation of a (meth)acrylate monomer(s) in the presence of a dihydroxy functional chain transfer agent such as thioglycerol according to the following reaction scheme.

The reaction is preferably carried out in the presence of an initiator such as azo bis-(isobutyronitrile) (AIBN).

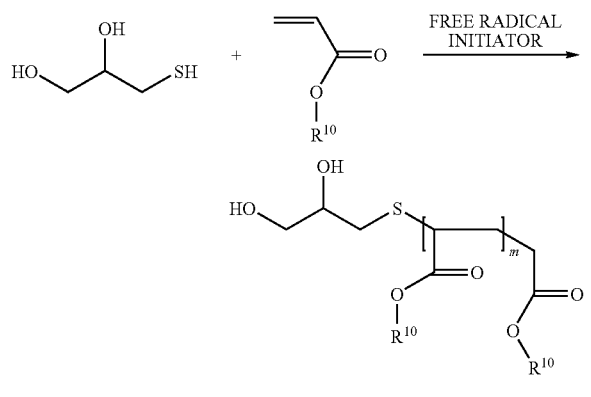

wherein $R^{10}$ and m are as defined hereinbefore.

Monohydroxy functional polymer chains (polyether, polyester or poly(alk)acrylate) may be converted to polymer chains containing both a hydroxyl and imino group at one end by first reaction with an isocyanate functional acrylate followed by a Michael addition of an alkanolamine to the resulting adduct.

The following scheme illustrates such a synthetic conversion starting with a monohydroxy functional polyester.

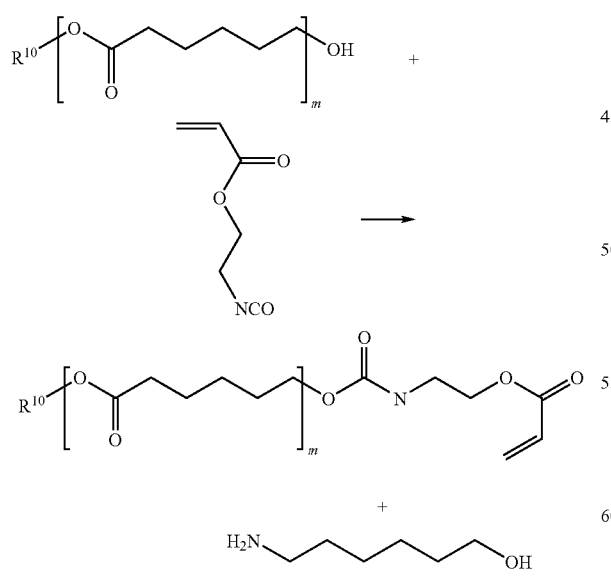

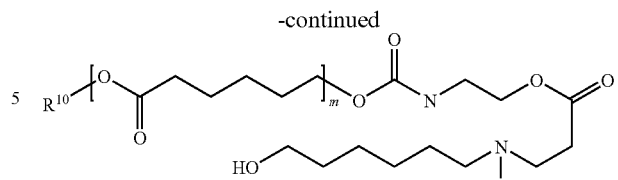

wherein $R^{10}$ and m are as defined hereinbefore.

When component (b) is a compound which contains a polyolefin chain it is preferably a polyolefin containing either two hydroxyl groups at one end of the polyolefin chain or one hydroxyl and one imino group at one end of the polyolefin chain. It is preferred that the polyolefin chain is polyisobutylene. Polyisobutylene chains which contain 2 or more isocyanate reactive groups at one end of the chain may be prepared from polyisobutenyl succinic anhydride (PIBSA). Reaction of PIBSA with an alkyl diamine yields a polyisobutylene with a primary amine on one

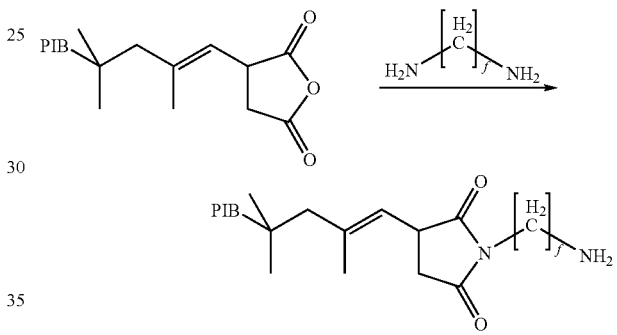

end. This is illustrated for one type of PIBSA:

The primary amine ended polyisobutylene chain may be converted to yield a product with two isocyanate reactive groups by Michael addition of a hydroxy functional acrylate or addition of ethylene oxide in an analogous way to that described above for poly (alkylene oxide) monoalkyl ether monoamines.

As disclosed hereinbefore component (c) is a compound containing an acid or amine group and at least two groups which react with isocyanates. Preferably the compound contains only two groups which react with isocyanates since this restricts cross-linking between adjacent chains of the dispersant. Acid groups are preferred. The acid group may be phosphonic, sulphonic or preferably carboxylic, including mixtures thereof. Preferably, the groups of component (c) which react with isocyanates are both hydroxy groups. A preferred diol which is component (a) is a compound of formula 8.

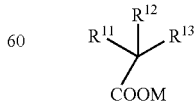

wherein at least two of the groups $R^{11}$, $R^{12}$ and $R^{13}$ are $C_{1-6}$-hydroxy alkyl and the remainder is $C_{1-6}$-hydrocarbyl group, which may be linear or branched alkyl, aryl, aralkyl or cycloalkyl, M is hydrogen or an alkaline metal cation, or quaternary ammonium cation. Preferred examples of carboxylic acid components are dimethylolpropionic acid (DMPA) and dimethylolbutyric acid (DMBA).

The acid containing compound which is component (c) may contain other acid groups in addition to or instead of a carboxylic group(s), such as phosphonic or sulphonic acid groups. An example of one such compound is 1,3-benzene dicarboxylic acid-5-sulpho-1,3-bis(2-hydroxyethyl)ester (EGSSIPA).

When component (c) carries a basic group in addition to the two groups which react with isocyanates it is essential that the basic group does not react with isocyanates. Basic groups of this type are aliphatic tertiary amines, hindered aromatic amines and nitrogen heterocyclic compounds which may be alicyclic or aromatic. Examples of hindered aromatic amines are phenylamines having a steric hindering group in the 2 and/or 6-position. Specific examples of component (c) having a basic group are N-methyl diethanolamine (NMDA), N-phenyldiethanolanine (NPDA) and N,N-bis(2-hydroxyethyl)isonicotinamide (HEINA).

The formative compounds which are component (d) of the polyurethane are preferably difunctional in respect of reactivity with isocyanates although a small amount of higher functionality may be used where a small amount of branching of the polyurethane polymer backbone is desired. However, it is preferred that component (d) is difunctional. Preferred reactive groups are amino and hydroxy and it is much preferred that component (d) is a diamine or especially a diol. Component (d), if present, is used primarily as a chain extender to alter the solubility of the polyurethane polymer.

Examples of suitable diamines are ethylene diamine, 1,4-butane diamine and 1,6-hexane diamine.

Examples of suitable diols are 1,6-hexanediol, 1,4-cyclohexanedimethanol (CHDM), 1,2-dodecanediol, 2-phenyl-1,2-propanediol, 1,4-benzene dimethanol, 1,4-butanediol and neopentyl glycol. The diol may also be a polyether such as a poly ($C_{2-4}$-alkylene glycol), a polyester or polyacrylic diol. The polyalkylene glycol may be a random or block (co) polymer containing repeat ethyleneoxy, propyleneoxy or butyleneoxy groups, including mixtures thereof.

As noted hereinbefore, it is preferred that the polyurethane polymer backbone is essentially linear in character. However, some small amount of branching may be tolerated and this branching may conveniently be introduced by means of a higher functional polyol such as timethylol propane, trimethylolethane or pentaerythritol.

As disclosed hereinbefore the chain terminating compound which is component (e) is mono-functional with respect to the isocyanate. The monofunctional group is preferably an amino or hydroxy group. Preferred terminating groups are poly ($C_{2-4}$-alkylene) mono alkyl ethers and mono alkyl ether amines similar to those used in the preparation of the lateral side chain compounds which are component (b) of the polyurethane.

An example of a monoisocyanate which acts as a chain terminating compound (component f) is phenyl isocyanate.

It is much preferred that the amount of component (f) is zero.

Typical amounts of the aforementioned compounds from which the polyurethane polymers are obtainable are 15-50% component (a), 10-80% component (b), 0-24% component (c), 0-25% component (d), 0-50% component (e) and 0-20% component (f), all based on the total weight of the polyurethane polymer.

When component (e) is a monofunctional polyether, polyester, poly(alk)acrylate or polyolefin the total amount of component (b) with component (e) is preferably not less than 35% and where component (e) is other than a monofunctional polyether, polyester or poly(alk)acrylate the amount of component (b) is preferably not less than 35%.

The polyurethane polymers according to the invention may be prepared by any method known to the art. Typically, the polyurethane polymer is obtainable or obtained by reacting one or more isocyanates having a functionality of from 2.0 to 2.5 (component (a)) with one or more compounds selected from polyethers having a poly ($C_{2-4}$-alkylene oxide) chain, polyester, polyacrylic, or polyolefin, each characterized by having at least two groups which react with isocyanates which are located at one end (component (b)) under substantially anhydrous conditions and in an inert atmosphere which is typically a temperature between 0 and 130° C., optionally in the presence of an inert solvent and optionally in the presence of a catalyst. Optionally, the reaction may also be carried out in the presence of one or more compounds having at least one acid or amine group (component (c)) and one or more formative compounds acting as chain extenders (component (d)) and optionally one or more compounds which act as chain terminating compounds which are components (e) and (f).

The inert atmosphere may be provided by any of the inert gases of the Periodic Table but is preferably nitrogen.

The preparation of the polyurethane polymer/prepolymer may be carried out in the presence of a catalyst. Particularly preferred catalysts are tin complexes of aliphatic acids such as dibutyl tin dilaurate (DBTDL) and tertiary amines.

The essential feature of the polyurethane polymer according to the invention is that it comprises a predominantly linear polyurethane polymer backbone containing the defined amount of lateral polymeric side chains which may poly (alkylene oxide), polyester, poly(alk)acrylate or polyolefin. There will thus be many variants which will be obvious to the skilled addressee regarding the ratio of isocyanate groups to isocyanate reactive groups including the formulation of prepolymers which have residual isocyanate functionality. In one case, the ratio of total isocyanate groups provided by component (a) is less than the total number of isocyanate reactive groups provided by component (b) and components (c) (d) and (e) when present. Any terminal isocyanate reactive groups may be reacted.

Alternatively, the ratio of total number of isocyanate groups provided by component (a) and optionally component (f) is greater that the total number of isocyanate reactive groups provided by component (b) and components (c), (d) and (e) when present. The resultant polyurethane is then a prepolymer containing residual isocyanate functionality. This prepolymer may then be reacted with other chain extenders such as component (d) which conjoins different prepolymer chains and/or with chain terminating compounds which are component (e), optionally prior to or during dissolution in water or other polar solvent. In one embodiment prepolymer is reacted with chain extenders prior to dissolution in water or other polar solvent. In one embodiment prepolymer is reacted with chain extenders during dissolution in water or other polar solvent. In one embodiment prepolymer is reacted with chain extenders prior to dissolution in the absence of water or other polar solvent. In one embodiment the prepolymer may be reacted with chain extenders in the absence of water.

The preparation of prepolymers can be useful since it is a means of controlling viscosity during the preparation of the polyurethane polymer, especially in circumstances where the reaction is carried out in the absence of any solvent.

When a prepolymer is formed which contains isocyanate functionality, chain extension may be carried out by water itself, or a polyol, amino-alcohol, a primary or secondary aliphatic, alicyclic, aromatic, araliphatic or heterocyclic polyamine especially a diamine, hydrazine or a substituted hydrazine.

Examples of suitable chain extenders include ethylenediamine, diethylene triamine, triethylene tetramine, propylenediamine, butylenediamine, hexamethylenediamine, cyclohexylenediamine, piperazine, 2-methyl piperazine, phenylenediamine, tolylene diamine, xylylene diamine, tris(2-aminoethyl)amine, 3,3'-dinitrobenzidine, 4,4'methylenebis(2-chloraniline), 3,3'-dichloro-4,4'bi-phenyl diamine, 2,6-diaminopyridine, 4,4'-diaminodiphenylmethane, methane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydreazine, hydrazides of dicarboxylic acids and sulphonic acid such as adipic acid mono- or dihydrazide, xalic acid dihydrazide, isophthalic acid dihydrazide, tartaric acid dihydrazide, 1,3-phenylene disulphonic acid dihydrazide, omega-aminocaproic acid dihydrazide, hydrazides made by reacting lactones with hydrazide such as gamma-hydroxylbutyric hydrazide, bis-semi-carbazide carbonic esters of glycols such as any of the glycols mentioned above. Hexamethylenediamine is especially preferred.

The chain extension can be conducted at elevated, reduced or ambient temperatures. Convenient temperatures are from about 5° C. to 95° C.

When employing a prepolymer in the preparation of the polyurethane polymer, the amount of chain extender and chain terminating compound are chosen to control the molecular weight of the polyurethane polymer. A high molecular weight will be favoured when the number of isocyanate-reactive groups in the chain extender is approximately equivalent to the number of free isocyanate groups in the prepolymer. A lower molecular weight of the polyurethane polymer is favoured by using a combination of chain extender and chain terminator in the reaction with the polyurethane prepolymer.

An inert solvent may be added before, during or after formation of the polyurethane polymer/prepolymer in order to control viscosity. Examples of suitable solvents are acetone, methylethylketone, dimethylformamide, dimethylacetamide, diglyme, N-methylpyrrolidone, butylacetate, methoxypropyl acetate, ethylacetate, ethylene and propylene glycoldiacetates, alkyl ethers of ethylene and propylene glycol acetates, toluene, xylene and sterically hindered alcohols such as t-butanol and diacetone alcohol. Preferred solvents are ethyl acetate, butyl acetate, methoxy propylacetate and N-methylpyrrolidone.

The number average molecular weight of the polyurethane polymer is preferably not less than 2,000, more preferably not less than 3,000 and especially not less than 4,000. It is also preferred that the number average molecular weight of the polyurethane polymer is not greater than 50,000, more preferably not greater than 30,000 and especially not greater than 20,000.

As noted hereinbefore some of the polyurethane dispersants are novel. Hence, as a further aspect of the invention there is provided a polyurethane dispersant having an essentially linear backbone and laterally attached solvent-solubilising polyether side chains of poly($C_{2-4}$-alkylene oxide) which contains less than 60% by weight ethylene oxide relative to the poly($C_{2-4}$-alkylene oxide) chain. In one preferred sub-group of such dispersants, the poly($C_{2-4}$-alkylene oxide) chain is the residue of a polyether which contains one hydroxyl and one imino (secondary amine) group at one end of the polyether chain which reacts with isocyanates. In a second preferred sub-group of polyether dispersants the poly($C_{2-4}$-alkylene oxide) chain is the residue of a polyether which contains two hydroxyl groups at one end of the polyether chain which react with isocyanates and which are separated by not less than 5 atoms.

In a further aspect of the invention there is provided a polyurethane dispersant having an essentially linear backbone and laterally attached solvent-solubilising polyether side chains of poly($C_{2-4}$-alkylene oxide) which contains less than 60% by weight ethylene oxide relative to the poly($C_{2-4}$-alkylene oxide) chain and from 10 to 180 milliequivalents of an ionic group (preferably carboxylic acid) for each 100 gm dispersant.

As a still further aspect of the invention there is provided a polyurethane dispersant having an essentially linear backbone and laterally attached solvent-solubilising polyester side chains. In one preferred sub-group of such polyester dispersants, the polyester side chain is the residue of a polyester which contains two hydroxyl groups at one end of the polyester chain which react with isocyanates and which are preferably separated by from 5 to 17 atoms.

INDUSTRIAL APPLICATION

Dispersions and mill bases made from the composition of the invention are particularly suitable for use in paints, including high solids paints, inks, especially flexographic, gravure and screen inks, colour filter layers for display screen equipment and non-aqueous ceramic processes.

The following examples provide an illustration of the invention. These examples are non exhaustive and are not intended to limit the scope of the invention. Unless expressed to the contrary all references are to parts by weight.

EXAMPLES

Preparation of Intermediates

Intermediate A—Dihydroxy Polyester (TDI, DEA, cap, val)

1-Dodecanol (54.77 parts, 0.294M), ε-caprolactone (318.48 parts, 2.79M) and δ-valerolactone (103 parts, 0.103M) were stirred together under nitrogen at 150° C. Zirconium butoxide catalyst (2.38 parts) was added and the reactants were stirred under nitrogen for 20 hours at 180° C. After cooling to 20° C., the polyester was obtained as a waxy solid. This is Polyester 1.

Tolylene diisocyanate (16.37 parts) was added to a reaction vessel heated to 40° C. Polyester 1 (148.3 parts) dissolved in methoxypropyl acetate (150 parts) was added over 40 minutes with stirring at 40-44° C. The reaction was continued with stirring at 50° C. for 75 minutes. The reactants were then cooled to 35° C. and diethanolamine (9.89 parts) was added. The reaction was continued with stirring at 35° C. until no isocyanate remained. This is Intermediate A.

Intermediate B—Hydroxyamino PO Polyether

Jeffamine™ M2005 (200 parts), 2-hydroxyethyl acrylate (11.61 parts) and 2,6-di-tert-butyl-4-methyl phenol (0.03 parts) were stirred together for 19 hours at 70° C. until the Michael addition reaction was complete. This is Intermediate B.

Intermediate C

Jeffamine™ M600 (400.0 parts), 2-hydroxyethylacrylate (81.28 parts) and 2,6-di-tert-butyl-4-methylphenol (0.06 parts) were stirred together for 19 hours at 70° C. until the Michael addition reaction was complete. This is intermediate C.

Intermediate D

Tolylene diisocyanate (24.14 parts, 95%+2,4 isomer) was charged to a stirred reaction vessel heated to 50° C. Poly (propylene glycol) monobutyl ether (127.95 parts, Mn 1200, ca. 0.77 mole equivalents relative to TDI) was charged to a dropping funnel and fed to the reaction mixture over 4 hours maintaining the temperature between 50-60° C. The reaction was then held at 70° C. for 60 minutes. Complete reaction was determined by titration for residual isocyanate then the reaction mixture was cooled to 20° C. Diethanolamine (17.9 parts ca. 1.59 mole equivalents based on TDI) was then added the reaction vessel held at room temperature until no isocyanate remained as determined by infrared analysis. The resulting mixture of products (which contained the unwanted diadduct of diethanolamine with TDI) was dissolved in diethyl ether and purified by eluting down a column of silica. The column was washed three times with diethyl ether, the fractions combined and solvent removed in vacuo to yield 90 parts of a solid product. This is Intermediate D. GPC analysis showed that the diadduct of diethanolamine with TDI had been removed.

Intermediate E

1-Dodecanol (9.32 parts), ε-caprolactone (108.43 parts) and δ-valerolactone (35.04 parts) were stirred together under nitrogen at 150° C. Zirconium butoxide catalyst (2.38 parts) was added and the reactants were stirred under nitrogen for 20 hours at 180° C. After cooling to 20° C., the polyester was obtained as a waxy solid. This is polyester 2.

Tolylene diisocyanate (4.06 parts) was added to a stirred reaction vessel heated to 40° C. Polyester 2 (70.0 parts) dissolved in ethyl acetate (70 parts) was added over 40 minutes with stirring at 50-54° C. The reaction was continued with stirring at ca. 50° C. for 120 minutes. The reactants were then cooled to 35° C. and diethanolamine (2.48 parts) was added followed by ethyl acetate (4.5 parts). The reaction was continued with stirring at 35° C. until no isocyanate remained. The product was obtained as a milky dispersion in ethyl acetate. The solids content was determined as 50 wt % by gravimetric analysis. This is Intermediate E.

Intermediate F

The dihydroxy functional initiator

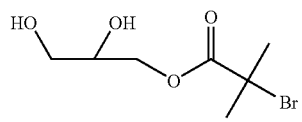

for use in atom transfer radical polymerisation was prepared according to the method described in *ACS Symposium Series*, New Orleans, 2000, 780, 148-161. This is initiator 1.

N-(n-propyl)-2-pyridylethanimine was prepared according to the method described in Macromolecules 1999, 32, 2110-2119.

To a round bottom flask was charged copper bromide (0.87 parts) butyl methacrylate (30 parts), butyl acetate (30 parts) and N-(n-propyl)-2-pyridylethanimine (1.62 parts). The solution was purged with nitrogen and heated to 65° C. Initiator 1 was then added and the solution held at 65° C. for 4 hours until the solids content reached 44 wt %. The reaction was then cooled and diluted with tetrahydrofuran (60 parts). Acidic alumina (20 parts) was then added to the solution and suspended by agitation for 10 minutes. Solids were removed from the resulting mixture by filtration and basic alumina (20 parts) was suspended in the filtrate passed for 10 minutes. The mixture was filtered and the majority of volatiles removed from the filtrate on a rotary evaporator. The resultant poly (butyl methacrylate) was further dried in a vacuum oven. The product was characterised using size exclusion chromatography relative to polystyrene standards and had Mn=5300 and PDI (Polydispersity Index)=1.1. This is intermediate P.

Intermediate G

To a round bottom flask was charged copper bromide (0.43 parts) butyl acrylate (30 parts) and pentamethylene diethylenetriamine (1.0 parts). The solution was purged with nitrogen and heated to 65° C. Initiator 1 (1.44 parts) was then added and the solution held at 65° C. for 4 hours until the solids content reached 90 wt %. Residual monomer was removed in vacuo. The resulting polybutyl acrylate was characterised using size exclusion chromatography with poly(methyl methacrylate) standards and had Mn=5900 and PDI=1.1. This is intermediate G.

Intermediate H

A mono hydroxy initiator

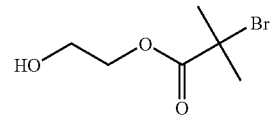

was prepared by reacting ethylene glycol with 2-bromopropionyl bromide according to the general method described in *ACS Symposium Series*, New Orleans, 2000, 780, 148-161. This is initiator 2.

To a round bottom flask was charged copper bromide (0.43 parts), butyl acrylate (34 parts) and pentamethylene diethylenetriamine (1.0 parts). The solution was purged with nitrogen and heated to 80° C. Initiator 2 (1.26 parts) was added and the solution held at 80° C. for 6 hours until the solids content reached 90%. Residual monomer was removed in vacuo. The resulting poly(butyl acrylate) was characterised using size exclusion chromatography relative to poly(methyl methacrylate) standards and had Mn=4500 and PDI=1.1. This is intermediate H.

Intermediate I

Stearic acid (340 parts), 12-hydroxystearic acid (4205 parts) were stirred together under nitrogen at 100° C. Zirconium butoxide catalyst (23 parts) was added and the reactants were stirred under nitrogen for 31 hours at 195° C. The reaction was cooled to 70° C. then ethanolamine was added and the reaction held at 70° C. for 1 hr. The product was heated to 140° C. for 12 hrs until the acid value was less than 5 mgKOH/g. The polyester was obtained as a waxy solid. This is Intermediate I.

Intermediate J

Stearic acid (495 parts), 12-hydroxystearic acid (7505 parts) were stirred together under nitrogen at 100° C. Zirconium butoxide catalyst (42 parts) was added and the reactants were stirred under nitrogen for 31 hours at 195° C. The reaction was cooled to 70° C. then diethanolamine was added and the reaction held at 70° C. for 1 hr. The product was heated to 140° C. for 10 hrs until the acid value was less than 5 mgKOH/g. The polyester was obtained as a liquid. This is intermediate J.

Dispersants

Example 1

PU Dispersant with Polyether Side Chains

Dimethylpropionic acid (4.0 parts and often referred to as 2,2-bis(hydroxymethyl)propionic acid), 1,4-cyclohexane dimethanol (7.25 parts), polypropylene glycol monobutyl ether (8.86 parts, Mn 1000), Intermediate B (18.0 parts, Mn 2116) and methoxypropyl acetate (58.86 parts) was stirred under nitrogen at 70° C. Dibutyltindilaurate (0.1 parts) and isophorone diisocyanate (20.68 parts) were sequentially added and the reactants were stirred under nitrogen for 3 hours at 70° C. until no isocyanate remained. This is Dispersant 1.

Example 2

PU Dispersant with Polyester Side Chains 1,6-Hexanediol (11.84 parts), Polyester 1 (17.81 parts, Mn 1600), Intermediate A (18.0 parts, Mn 1857) and methoxypropyl acetate (67.81 parts) were stirred under nitrogen at 70° C. Tin (II) octanoate (0.09 parts) was added followed by tolylene diisocyanate (20.09 parts). The reactants were stirred under nitrogen for 3 hours until no isocyanate remained. This is Dispersant 2.

Example 3

PU Dispersant with Polyether Side Chains 1,4-Cyclohexane dimethanol (12.36 parts), Intermediate B (20.15 parts Mn=2116) and methoxypropyl acetate (69.05 parts) were stirred under nitrogen at 70° C. Dibutyltindilaurate (0.08 parts) and tolylene diisocyanate (17.42 parts) were added and the reaction stirred under nitrogen for 2 hours. Jeffamine™ M2005 (19.05 parts) was then added and the reactants stirred under nitrogen for 4 hours at 70° C. until no isocyanate remained. This is Dispersant 3.

Example 4

A dispersion was prepared by dissolving Dispersant 1 (0.25 parts) in a solution of nitrocellulose resin (1.16 parts) in a 5:1 mixture of ethanol and ethylacetate (6.09 parts). 3 mm Diameter glass beads (20 parts) and carbon black pigment (Special Black 250 ex Degussa, 2.5 parts) was added and milled on a horizontal shaker for 16 hours. The resultant millbase exhibited excellent fluidity.

Example 5

A dispersion was prepared by dissolving Dispersant 2 (0.4 parts) in a 5:1 mixture of methoxy propylacetate and n-butanol (8.1 parts). 3 mm Diameter glass beads (20 parts) and red pigment (1.5 parts, Chromaphthal™ Red A2B, ex Ciba) were added and the contents were milled on a horizontal shaker for 16 hours. The resultant millbase exhibited excellent fluidity.

Example 6

A dispersion was prepared by dissolving Dispersant 3 (1.0 parts) in a 1.8:1 mixture of ethanol and ethyl acetate (7.0 parts). 3 mm Diameter glass beads (20 parts) and black pigment (2.0 parts, Printex™ 35, ex Degussa) were added and the contents milled on a horizontal shaker for 16 hours. The resultant millbase exhibited excellent fluidity.

Example 7

Intermediate B (35 parts) and ethyl acetate (59.30 parts) were stirred under nitrogen at 50° C. Isophorone diisocyanate (3.68 parts) was added and the reaction stirred under nitrogen for 10 minutes at 60° C. Dibutyltin dilaurate (0.08 parts) was added followed by isophorone diisocyanate (2.51 parts). The reaction mixture was held at 60° C. for 10 minutes then Jeffamine™ M2005 (5 parts, ex Huntsman) was added. The batch was held at 60° C. for 10 minutes then m-xylenediamine was added (4.08 parts) followed by isophorone diisocyanate (4.66 parts). The reaction mixture was held for a further 10 minutes then Jeffamine™ M2005 (6.5 g, ex Huntsman) was added. The reaction was held at 70° C. for 3 hours under nitrogen until no isocyanate remained. This is dispersant 7.

Example 8

1,4-Benzene dimethanol (12.58 parts), Intermediate B (88.2 parts), 2,2-bis(hydroxymethyl)propionic acid (6.72 parts) and ethyl acetate (146.7 parts) were stirred under nitrogen at 70° C. Dibutyltin dilaurate (0.08 parts) was then added. Hexamethylene diisocyanate (32.29 parts) was dissolved in ethyl acetate (30 parts) and charged to the reaction mixture over 37 minutes. The reaction was held at 70° C. for 1 hour then Jeffamine™ M2005 (36.57 parts, ex Huntsman) was charged. The reaction mixture was stirred under nitrogen for a further 20 hours at 70° C. until no isocyanate remained. This is dispersant 8.

Example 9

1,4-Cyclohexanedimethanol (10.82 parts), Intermediate B (17.7 parts) and ethyl acetate (66.69 parts) were stirred under nitrogen at 70° C. Dibutyltin dilaurate (0.08 parts) was then added. 1,3-bis(1-isocyanato-1-methylethyl)-benzene (21.4 parts) was charged to the reaction mixture over 15 minutes. The reaction was held at 70° C. for 1 hour then Jeffamine™ M2005 (16.69 parts, ex Huntsman) was charged. The reaction mixture was stirred under nitrogen for a further 2 hours at 70° C. until no isocyanate remained. This is dispersant 9.

Example 10

Methylenedi-p-phenyldiisocyanate (46.38 parts) was charged to ethyl acetate (54.24 parts) and heated to 63° C. under nitrogen. Dibutyltin dilaurate (0.1 parts) was charged to the solution and poly(propylene glycol) monobutyl ether (Mn 2500, 84.24 parts) was added over 30 minutes. This is solution 1.

To a second vessel 1,4-Cyclohexanedimethanol (6.61 parts), 2,2-bis(hydroxymethyl)propionic acid (9.66 parts), Intermediate B (107.10 parts) and ethyl acetate (200 parts) were charged and heated to 70° C. with stirring under nitrogen. Dibutyltin dilaurate (0.1 parts) was added and then solution 1 was charged over 1 hour. The reaction was held at 70° C. for 20 hours until no isocyanate remained. The product was characterised using size exclusion chromatography relative to polystyrene) standards and had Mn=19,000 and PDI (Polydispersity Index)=2.4. This is dispersant 10.

Example 11

1,4-Cyclohexanedimethanol (3.19 parts), intermediate B (34.5 parts), 2,2-bis(hydroxymethyl)propionic acid (2.2 parts) and ethyl acetate (60.97 parts) were stirred under nitrogen at 70° C. Dibutyltin dilaurate (0.08 parts) was then added. Tolylene diisocyanate (10.03 parts charged to the reaction mixture over 37 minutes. The reaction was held at 70° C. for 1 hour then Jeffamine™ M2005 (10.97 parts, ex Huntsman) was charged. The reaction mixture was stirred under nitrogen for a further 20 hours at 70° C. until no isocyanate remained. The product was characterised using size exclusion chromatography relative to polystyrene) standards and had Mn=10,900 and PDI (Polydispersity Index)=2.0. This is dispersant 11.

Example 12

Tolylene diisocyanate (63.13 parts) was heated to 50° C. under nitrogen. Dibutyltin dilaurate (0.22 parts) was charged to the solution and poly(propylene glycol) monobutyl ether (86.31 parts, Mn 2500) was added over 30 minutes. This is solution 2.

To a second vessel 2,2-bis(hydroxymethyl)propionic acid (33.78 parts), Intermediate B (197.65 parts) and ethyl acetate (381.31 parts) were charged and heated to 70° C. with stirring under nitrogen. Dibutyltin dilaurate (0.22 parts) was added and then solution 2 was charged over 1 hour. The reaction was held at 70° C. for 20 hours until no isocyanate remained. The product was characterised using size exclusion chromatography relative to polystyrene) standards and had Mn=11,100 and PDI (Polydispersity Index)=1.6. This is dispersant 12.

Example 13

1,4-Cyclohexanedimethanol (6.19 parts), intermediate B (58.65 parts), n-methyldiethanolamine (2.81 parts) and ethyl acetate (103.84 parts) were stirred under nitrogen at 70° C. Tolylene diisocyanate (4.83 parts) was charged followed by dibutyltin dilaurate (0.13 parts). Two further aliquots of tolylene diisocyanate were charged (3.61 parts and 8.79 parts) and the reaction mixture held at 70° C. for 1 hour. Jeffamine™ M2005 (18.84 parts, ex Huntsman) was then added. The reaction mixture was stirred under nitrogen for a further 2 hours at 70° C. until no isocyanate remained. The product was characterised using size exclusion chromatography relative to polystyrene) standards and had Mn=14,200 and PDI (Polydispersity Index)=2.2. This is dispersant 13.

Example 14

Dispersant 13 (30 parts) as prepared and benzyl chloride (0.39 parts) were heated to 65° C. under nitrogen for 16 hrs. The reaction was cooled to room temperature. This is dispersant 14.

Example 15

Methylenedi-p-phenyldiisocyanate (50.46 parts) was charged to ethyl acetate (100 parts) and heated to 64° C. under nitrogen. Dibutyltin dilaurate (0.15 parts) was charged to the solution and poly(propylene glycol) monobutyl ether (62.47 parts, Mn 1704) was added over 30 minutes. This is solution 3.

To a second vessel n-methyldiethanolamine (14.24 parts), intermediate B (135 parts) and ethyl acetate (100 parts) were charged and heated to 70° C. with stirring under nitrogen. Dibutyltin dilaurate (0.15 parts) was added and then solution 3 was charged over 1 hour. Ethyl acetate (62.47 parts) was then added. The reaction was held at 70° C. for 2 hours until no isocyanate remained. The product was characterised using size exclusion chromatography relative to polystyrene) standards and had Mn=12,600 and PDI (Polydispersity Index) =3.0. This is dispersant 15.

Example 16

To dispersant 15 (397.41 parts) was added ethyl acetate (10.31 parts) and benzyl chloride (10.31 parts). The mixture was heated to 65° C. under nitrogen for 16 hrs. The reaction was cooled to room temperature. This is dispersant 16.

Example 17

1,4-Cyclohexanedimethanol (2.00 parts), intermediate B (34.50 parts), 2,2-bis(hydroxymethyl)propionic acid (2.2 parts), n-phenyldiethanolamine (1.2 parts), and ethyl acetate (60.97 parts) were stirred under nitrogen at 70° C. Dibutyltin dilaurate (0.08 parts) was then added. Tolylene diisocyanate (10.03 parts) was charged to the reaction mixture over 30 minutes. The reaction was held at 70° C. for 1 hour then Jeffamine™ M2005 (10.97 parts, ex Huntsman) was charged. The reaction mixture was stirred under nitrogen for a further 20 hours at 70° C. until no isocyanate remained. This is dispersant 17.

Example 18

Methylenedi-p-phenyldiisocyanate (42.96 parts) was charged to ethyl acetate (110.0 parts) and heated to 71° C. under nitrogen. Dibutyltin dilaurate (0.1 parts) was charged to the solution and poly(propylene glycol) monobutyl ether (78.03 parts, Mn 2500) was added over 30 minutes. This is solution 4.

To a second vessel 1,4-cyclohexanedimethanol (0.64 parts), poly(caprolactone diol) (12.83 parts, Mn 530), 2,2-bis(hydroxymethyl)propionic acid (9.9 parts), intermediate B (113.40 parts) and ethyl acetate (148.03 parts) were charged and heated to 70° C. with stirring under nitrogen. Dibutyltin dilaurate (0.17 parts) was added and then solution 4 was charged over 1 hour. The reaction was held at 70° C. for 20 hours until no isocyanate remained. The product was characterised using size exclusion chromatography relative to polystyrene) standards and had Mn=12,100 and PDI (Polydispersity Index)=2.4. This is dispersant 18.

Example 19

1,4-Cyclohexanedimethanol (10.22 parts), intermediate B (187.50 parts), 2,2-bis(hydroxymethyl)propionic acid (9.63 parts) and ethyl acetate (200 parts) were stirred under nitrogen at 70° C. Dibutyltin dilaurate (0.38 parts) was then added. Tolylene diisocyanate (42.28 parts) in ethyl acetate (40 parts) was charged to the reaction mixture over 30 minutes. The reaction was held at 70° C. for 1 hour then dibutylamine (2.99 parts) in ethyl acetate (12.99 parts) was charged. The reaction mixture was stirred under nitrogen for a further 20 hours at 70° C. until no isocyanate remained. This is dispersant 19.

Example 20

Methylenedi-p-phenyldiisocyanate (56.06 parts) was charged to ethyl acetate (100.0 parts) and heated to 70° C. with stirring under nitrogen. Dibutyltin dilaurate (0.12 parts)

was charged to the solution and poly(propylene glycol) monobutyl ether (146.09 parts, Mn 2500) was added over 30 minutes. This is solution 5.

To a second vessel 1,4-cyclohexanedimethanol (9.94 parts), 2,2-bis(hydroxymethyl)propionic acid (11.68 parts), intermediate B (82.08 parts) and ethyl acetate (150 parts) were charged and heated to 70° C. with stirring under nitrogen. Dibutyltin dilaurate (0.12 parts) was added and then solution 5 was charged over 1 hour. Ethyl acetate (56.9 parts) was charged to the reaction mixture. The reaction was held at 70° C. for 20 hours until no isocyanate remained. The product was characterised using size exclusion chromatography relative to polystyrene) standards and had Mn=10,200 and PDI (Polydispersity Index)=2.3. This is dispersant 20.

Example 21

Methylenedi-p-phenyldiisocyanate (53.80 parts) was charged to ethyl acetate (120 parts) and heated to 70° C. with stirring under nitrogen. Dibutyltin dilaurate (0.15 parts) was charged to the solution and poly(propylene glycol) monobutyl ether (97.72 parts, Mn 2500) was added over 30 minutes. This is solution 6.

To a second vessel 1,4-cyclohexanedimethanol (8.54 parts), 2,2-bis(hydroxymethyl)butyric acid (11.36 parts), intermediate B (126.00 parts) and ethyl acetate (177.72 parts) were charged and heated to 70° C. with stirring under nitrogen. Dibutyltin dilaurate (0.15 parts) was added and then solution 1 was charged over 1 hour. The reaction was held at 70° C. for 20 hours until no isocyanate remained. The product was characterised using size exclusion chromatography relative to polystyrene) standards and had Mn=12,000 and PDI (Polydispersity Index)=2.4. This is dispersant 21.

Example 22

1,4-Cyclohexanedimethanol (5.12 parts), intermediate D (25.20 parts), and ethyl acetate (50.52 parts) were stirred under nitrogen at 70° C. Dibutyltin dilaurate (0.08 parts) was then added. Tolylene diisocyanate (9.62 parts) was charged to the reaction mixture over 30 minutes in four aliquots. The reaction was held at 70° C. for 1 hour then Jeffamine™ 2005 (10.52 parts, ex Huntsman) was added. The reaction mixture was stirred under nitrogen for a further 2 hours at 70° C. until no isocyanate remained. This is dispersant 22.

Example 23

1,4-Cyclohexanedimethanol (3.17 parts), intermediate C (34.00 parts), and ethyl acetate (54.18 parts) were stirred under nitrogen at 70° C. Dibutyltin dilaurate (0.08 parts) was then added. Tolylene diisocyanate (12.75 parts) was charged to the reaction mixture over 30 minutes in four aliquots. The reaction was held at 70° C. for 1 hour then Jeffamine™ 600 (4.18 parts, ex Huntsman) was added. The reaction mixture was stirred under nitrogen for a further 2 hours at 70° C. until no isocyanate remained. This is dispersant 23.

Example 24

Dispersions were prepared by dissolving each of the dispersants 7-23 (1.0 parts) in a 3:1 mixture of ethanol and ethyl acetate (7.0 parts). Glass beads (3 mm diameter, 20 parts) and black pigment (2.0 parts, Printex™ 35, ex Degussa) were added and the contents milled on a horizontal shaker for 16 hours. The resultant millbases exhibited excellent fluidity. A comparative control dispersion was prepared without a dispersant i.e. a mixture of a 3:1 mixture of ethanol and ethyl acetate (8.0 parts), glass beads (3 mm diameter, 20 parts) and black pigment (2.0 parts, Printex™ 35, ex Degussa) were milled on a horizontal shaker for 16 hours. The resulting dispersion was highly viscous with the characteristics of a gel.

The millbases (1.0 parts) were let down into (a) a polyurethane resin, NeoRez™ U395 (3.0 parts, ex NeoResins), and (b) a nitrocellulose resin, NC DLX 3/5, (3.0 parts, ex Nobel Enterprises) and the resulting inks drawn down on to black and white card using a number 3 K-bar. A simple visual assessment was made of the drawdowns based on hiding power, jetness and gloss with a scoring system of 1 to 5. A score of 5 indicates the best performance. A control experiment with no dispersant gave a let down with quality equal to 1.

| Dispersant | Score for let down into polyurethane | Score for let down into nitrocellulose |
| --- | --- | --- |
| none | 1 | 1 |
| 7 | 5 | 4 |
| 8 | 4 | 3 |
| 9 | 3 | 3 |
| 10 | 4 | 5 |
| 11 | 5 | 4 |
| 12 | 4 | 5 |
| 13 | 4 | 3 |
| 14 | 5 | 5 |
| 15 | 4 | 4 |
| 16 | 5 | 5 |
| 17 | 4 | 5 |
| 18 | 4 | 5 |
| 19 | 4 | 4/3 |
| 20 | 3 | 4 |
| 21 | 4 | 5 |
| 22 | 4 | 5 |
| 23 | 3 | 3 |

Example 25

1,4-Cyclohexanedimethanol (5.19 parts), Intermediate B (22.50 parts), Intermediate A (25 parts) and ethyl acetate (22.5 parts) were stirred under nitrogen at 70° C. Dibutyltin dilaurate (0.075 parts) was then added. Tolylene diisocyanate (9.74 parts) in ethyl acetate (10 parts) was charged to the reaction mixture over 30 minutes. The reaction was held at 70° C. for 1 hour then polyester 1 (8.52 parts) in ethyl acetate (13.52 parts) was charged. The reaction mixture was stirred under nitrogen for a further 20 hours at 70° C. until no isocyanate remained. This is dispersant 25.

Example 26

1,4-Cyclohexanedimethanol (6.29 parts), Intermediate A (65 parts) and ethyl acetate (7.24 parts) were stirred under nitrogen at 70° C. Dibutyltin dilaurate (0.075 parts) was then added. Tolylene diisocyanate (11.14 parts) in ethyl acetate (10 parts) was charged to the reaction mixture over 30 minutes. The reaction was held at 70° C. for 1 hour then Polyester 1 (9.74 parts) in ethyl acetate (12.00 parts) was charged. The reaction mixture was stirred under nitrogen for a further 20 hours at 70° C. until no isocyanate remained. This is dispersant 26.

Example 27

Hexanediol (1.26 parts), Intermediate A (13.20 parts), n-methyldiethanolamine (1.58 parts), polyester 1 (9.90 parts), dibutyltin dilaurate (0.03 parts) and ethyl acetate (30.32 parts) were stirred under nitrogen at 70° C. Tolylene diisocyanate (5.93 parts) was charged over 15 minutes and the reaction mixture held at 70° C. for 20 hours until no isocyanate remained. This is dispersant 27.

Example 28

To dispersant 28 (30 parts) was added ethyl acetate (0.71 parts) and benzyl chloride (0.71 parts) were heated to 65° C. under nitrogen for 16 hrs. The reaction was cooled to room temperature. This is dispersant 28.

Example 29

Hexanediol (0.62 parts), Intermediate A (6.00 parts), 2,2-bis(hydroxymethyl)propionic acid (0.72 parts), polyester 1 (4.42 parts), dibutyltin dilaurate (0.02 parts) and ethyl acetate (13.70 parts) were stirred under nitrogen at 70° C. Tolylene diisocyanate (2.64 parts) was charged over 15 minutes and the reaction mixture held at 70° C. for 20 hours until no isocyanate remained. This is dispersant 29.

Example 30

Hexanediol (4.86 parts), Intermediate E (7.20 parts), polyester 2 (12.98 parts), dibutyltin dilaurate (0.03 parts) and ethyl acetate (32.98 parts) were stirred under nitrogen at 70° C. Tolylene diisocyanate (7.91 parts) was charged over 15 minutes and the reaction mixture held at 70° C. for 20 hours until no isocyanate remained. This is dispersant 30.

Example 31

Hexanediol (7.34 parts), Intermediate F (10.8 parts), and methoxypropyl acetate (40.47 parts) were stirred under nitrogen at 70° C. Tin(II) octanoate (0.05 parts) was then added. Tolylene diisocyanate (11.81 parts) was charged to the reaction mixture over 30 minutes in four aliquots. The reaction was held at 70° C. for 1 hour then polyester 1 (10.47 parts) was added. The reaction mixture was stirred under nitrogen for a further 2 hours at 70° C. until no isocyanate remained. This is dispersant 31.

Example 32

Hexanediol (5.21 parts), Intermediate G (11.25 parts), and methoxy propyl acetate (32.54 parts) were stirred under nitrogen at 70° C. Tin(II) octanoate (0.05 parts) was then added. Tolylene diisocyanate (8.5 parts) was charged to the reaction mixture over 30 minutes in four aliquots. The reaction was held at 70° C. for 1 hour then polyester 1 (7.54 parts) was added. The reaction mixture was stirred under nitrogen for a further 2 hours at 70° C. until no isocyanate remained. This is dispersant 32.

Example 33

Hexanediol (4.44 parts), Intermediate G (6.13 parts), and methoxypropyl acetate (24.50 parts) were stirred under nitrogen at 70° C. Tin(II) octanoate (0.03 parts) was then added. Tolylene diisocyanate (6.91 parts) was charged to the reaction mixture over 30 minutes in four aliquots. The reaction was held at 70° C. for 1 hour then Intermediate H (7.00 parts) was added. The reaction mixture was stirred under nitrogen for a further 2 hours at 70° C. until no isocyanate remained. This is dispersant 33.

Example 34

Dispersions were prepared by dissolving each of the Dispersants 25-33 (0.4 parts) in a 5:1 mixture of methoxypropyl acetate and n-butanol (8.1 parts). 3 mm Diameter glass beads (20 parts) and red pigment (1.5 parts, Chromaphthal™ Red A2B, ex Ciba) were added and the contents were milled on a horizontal shaker for 16 hours. The resultant mill bases exhibited fluidity as described in the following table.

| Dispersant | Fluidity of millbase |
| --- | --- |
| None (Control) | Immovable gel |
| 25 | Excellent fluidity |
| 26 | Excellent fluidity |
| 27 | Fluid, gels on standing |
| 28 | Excellent fluidity |
| 29 | Fluid, gels on standing |
| 30 | Excellent fluidity |
| 31 | Excellent fluidity |
| 32 | Excellent fluidity |
| 33 | Excellent fluidity |

Example 35

A dispersion was prepared by dissolving Dispersant 11 (3.5 parts) in Macrynal™ SM565 (1.05 parts, commercially available from Surface Specialties UCB) and methoxypropyl acetate (24.50 parts). 3 mm Diameter glass beads (125 parts) and red pigment (5.95 parts, Irgaphor™ red B-CF ex Ciba) were added and the contents were milled on a skandex shaker for 1 hour. The resultant mill base exhibited excellent fluidity. The mill base viscosity remained below 0.1 Pa·s as the shear rate was increased from 38.6 to 2391.1 $s^{-1}$.

The resulting Mill base was let down into Macrynal™ SM56570BAC (24.45 parts), Desmodur™ N3390 (2.2 parts) and methoxypropyl acetate (17.68 parts) then drawn down onto black and white card using a number 3 K-bar. The resulting surface maintained high gloss values 95.7 (60° angle) and 58.6 (20° angle).

Example 36

A dispersion was prepared by dissolving each of the dispersants 10, 11 or 18 in Macrynal™ SM565 (1.05 parts) and propylene glycol methyl ether (21.40 parts) 3 mm glass beads (125 parts) and blue pigment (8.75 parts, Heliogen™ Blue L6700F ex Bayer) were added. The resultant mill bases exhibited excellent fluidity The mill bases were let down into Macrynal™ SM565/70BAC (36.36 parts), Desmodur™ N3390 (3.24 parts, ex Bayer) and methoxypropyl acetate (39.02 parts) then drawn down onto black and white card using a number 3 K-bar. The resulting surface maintained high gloss values.

| Dispersant | Mill base Viscosity at a shear rate of 37.6 $s^{-1}$ | Gloss 60° C. | Gloss 20° C. | Haze |
| --- | --- | --- | --- | --- |
| 10 | 1.857 | 80.0 | 48.7 | 337 |
| 11 | 0.938 | 81.9 | 56.9 | 247 |
| 18 | 1.296 | 82.9 | 56.7 | 282 |

Example 37

1,4-Cyclohexanedimethanol (13.88 parts), intermediate I (40.16 parts), Intermediate J (60 parts) and toluene (140.16 parts) were stirred under nitrogen at 75° C. Dibutyltin dilaurate (0.15 parts) was then added. Tolylene diisocyanate (25.97 parts) was charged to the reaction mixture over 100 minutes. The reaction was stirred under nitrogen for a further 22 hours at 75° C. until no isocyanate remained.

Example 38

A dispersion was prepared by dissolving Dispersant 37 (1.0 parts) in toluene (7 parts). 3 mm Diameter glass beads (20 parts) and red pigment (2.0 parts, Chromaphthal™ Red A2B, ex Ciba) were added and the contents were milled on a horizontal shaker for 16 hours. The resultant mill base exhibited excellent fluidity.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

The invention claimed is:

1. A non-aqueous composition comprising a particulate solid, an organic medium and a polyurethane dispersant having a number average molecular weight between 2000 and 50,000 and laterally attached solvent-solubilising side chains of a polyester, optionally including mixtures with solvent-solubilising polyether and/or polyacrylate side chains wherein the polyurethane dispersant comprises the reaction product of polyisocyanates having an average functionality of 2.0 to 2.1, compounds having at least one polyester having at least two groups which react with isocyanates which are located at one end of the compound such that the polyester thereby forms laterally attached solvent-solubilising chains, optionally compounds having an acid or amino group further having at least two groups which react with isocyanates, optionally one or more formative compounds having number average molecular weights of 32 to 3000 which have at least two groups which react with isocyanates, and optionally one or more compounds which act as chain terminators.

2. The composition as claimed in claim 1 wherein the polyester, polyether and polyacrylate side chains contain a terminating $C_{1-50}$-hydrocarbyl group.

3. The composition of claim 1 wherein the polyether chain is poly($C_{2-4}$-alkylene oxide) containing less than 60% by weight ethylene oxide.

4. The composition of claim 1 wherein the polyester chain is derived from polymerizing hydroxy carboxylic acid or lactone thereof containing from 1 to 26 carbon atoms, including mixtures thereof.

5. The composition of claim 4 wherein the lactone is ε-caprolactone or δ-valerolactone.

6. The composition of claim 1 wherein the number-average molecular weight of the polyester, polyether or polyacrylate side chain is from 300 to 10,000.

7. The composition of claim 1 wherein the polyurethane dispersant additionally comprises from 10 to 180 milliequivalents for each 100 g dispersant of an acid and/or amino group.

8. The composition of claim 1 wherein the laterally attached solvent-solubilising side chains comprise a polyester which is characterized as being the reaction product of a polyester having two hydroxyl groups at one end of the polyester separated by up to 17 atoms.

9. The composition of claim 1 wherein the total weight percentage of solvent-solubilising lateral side chains is not less than 5% based on the total weight of the polyurethane dispersant.

10. The composition of claim 1 wherein the laterally attached solvent-solubilising side chains comprise a polyether which is characterized as being the reaction product of a polyether having two hydroxyl groups separated by up to 17 atoms or a hydroxyl and a secondary amino group separated by up to 6 carbon atoms.

11. The composition of claim 1 wherein the solvent-solubilising polyether chain contains the residue of a compound of formula 1

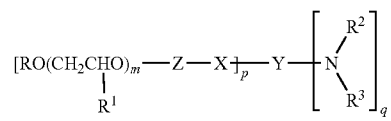

wherein
R is $C_{1-20}$-hydrocarbyl group;
$R^1$ is hydrogen, methyl or ethyl of which less than 60% is hydrogen;
$R^2$ and $R^3$ are each, independently, $C_{1-8}$-hydroxyalkyl;
Z is $C_{2-4}$-alkylene;
X is —O— or —NH—;
Y is the residue of a polyisocyanate;
m is from 5 to 150;
p is from 1 to 4; and
q is 1 or 2.

12. The composition of claim 1 wherein the solvent solubilising polyether chain contains the residue of compound of formula 2

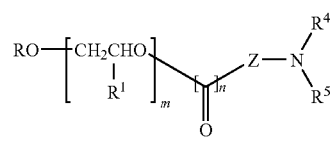

wherein
R is $C_{1-20}$-hydrocarbyl group;
$R^1$ is hydrogen, methyl or ethyl of which less than 60% is hydrogen;
$R^4$ is an isocyanate reactive organic radical;

$R^5$ is hydrogen or an isocyanate-reactive organic radical;
Z is $C_{2-4}$-alkylene
m is from 5 to 150; and
n is 0 to 1.

13. The composition of claim 1 wherein the solvent-solubilising polyether chain contains the residue of a compound of formula 3

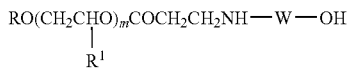    3 wherein
R is $C_{1-20}$-hydrocarbyl group;
$R^1$ is hydrogen, methyl or ethyl of which less than 60% is hydrogen;
W is $C_{2-6}$-alkylene; and
m is from 5 to 150.

14. A non-aqueous millbase, paint or ink which comprises a film-forming resin and the composition of claim 1.

15. The polyurethane dispersant of claim 1, wherein the polyurethane dispersant has laterally attached solvent-solubilising side chains of a polyacrylate which are the reaction product of a polyacrylate having two hydroxyl groups separated by up to 4 carbon atoms.

16. A polyurethane dispersant having laterally attached solvent-solubilising polyester side chains, which is the residue of a polyester which contains two hydroxyl groups at one end of the polyester chain which react with isocyanates wherein the isocyanates used to make the polyurethane dispersant are characterized by an average functionality of 2.0.

17. The polyurethane dispersant of claim 16 comprising a polyester side chain wherein said two hydroxyl groups at one end of the polyester chain which react with isocyanates are separated by from 5 to 17 atoms.

* * * * *